US007305117B2

(12) United States Patent
Davis et al.

(10) Patent No.: US 7,305,117 B2
(45) Date of Patent: Dec. 4, 2007

(54) METHODS AND TANGIBLE OBJECTS EMPLOYING MACHINE READABLE DATA

(75) Inventors: Bruce L. Davis, Lake Oswego, OR (US); Geoffrey B. Rhoads, West Linn, OR (US)

(73) Assignee: Digimarc Corporation, Beaverton, CO (US)

( * ) Notice: Subject to any disclaimer, the term of this patent is extended or adjusted under 35 U.S.C. 154(b) by 0 days.

(21) Appl. No.: 11/456,809

(22) Filed: Jul. 11, 2006

(65) Prior Publication Data

US 2007/0171761 A1 Jul. 26, 2007

Related U.S. Application Data

(63) Continuation of application No. 11/106,186, filed on Apr. 13, 2005, now Pat. No. 7,076,084, which is a continuation of application No. 10/693,269, filed on Oct. 23, 2003, now Pat. No. 6,882,738, which is a continuation of application No. 09/151,492, filed on Sep. 11, 1998, now abandoned.

(51) Int. Cl.
G06K 9/00 (2006.01)
H04K 1/00 (2006.01)
(52) U.S. Cl. ............... 382/141; 340/5.8; 438/16
(58) Field of Classification Search ............. 382/100, 382/141, 143, 145, 152; 340/500, 540, 635, 340/653, 5.8; 235/468; 438/14, 15, 16, 438/17
See application file for complete search history.

(56) References Cited

U.S. PATENT DOCUMENTS

| 4,150,781 A | 4/1979 | Silverman et al. ........... 235/382 |
| 4,269,473 A | 5/1981 | Flothmann et al. ......... 350/3.61 |
| 4,510,673 A * | 4/1985 | Shils et al. .................... 29/574 |
| 4,532,508 A | 7/1985 | Ruell ....................... 340/825.34 |
| 4,590,366 A | 5/1986 | Rothfjell ..................... 235/494 |
| 4,641,017 A | 2/1987 | Lopata ........................ 235/457 |
| 4,889,366 A | 12/1989 | Fabbiani ....................... 283/86 |
| 4,896,363 A | 1/1990 | Taylor et al. ................... 382/5 |
| 4,945,215 A | 7/1990 | Fukushima et al. ......... 235/457 |
| 4,963,756 A | 10/1990 | Quan et al. .................. 250/568 |
| 5,079,648 A | 1/1992 | Maufe .......................... 360/31 |
| 5,095,194 A | 3/1992 | Barbanell .................... 235/379 |
| 5,138,468 A | 8/1992 | Barbanell ....................... 359/2 |
| 5,145,212 A | 9/1992 | Mallik .......................... 283/86 |
| 5,175,774 A * | 12/1992 | Truax et al. .................... 382/8 |
| 5,306,899 A | 4/1994 | Marom et al. ............... 235/382 |
| 5,321,751 A | 6/1994 | Ray et al. ...................... 380/23 |
| 5,329,108 A | 7/1994 | Lamoure ..................... 235/494 |
| 5,336,871 A | 8/1994 | Colgate, Jr. .................. 235/380 |
| 5,337,361 A | 8/1994 | Wang et al. ................... 380/51 |
| 5,396,559 A | 3/1995 | McGrew ....................... 380/54 |
| 5,411,296 A | 5/1995 | Mallik .......................... 283/86 |
| 5,422,744 A | 6/1995 | Katz et al. ...................... 359/2 |
| 5,428,683 A | 6/1995 | Indeck et al. ................... 380/4 |
| 5,432,329 A | 7/1995 | O'Boyle et al. ............. 235/487 |
| 5,448,053 A | 9/1995 | Rhoads ..................... 250/201.9 |
| 5,499,293 A | 3/1996 | Behram et al. ................. 380/4 |
| 5,607,188 A | 3/1997 | Bahns et al. ................. 283/113 |
| 5,612,943 A | 3/1997 | Moses et al. ................ 369/124 |
| 5,613,004 A | 3/1997 | Cooperman et al. .......... 380/28 |
| 5,636,292 A | 6/1997 | Rhoads ........................ 382/232 |
| 5,652,626 A | 7/1997 | Kawakami et al. ......... 348/463 |
| 5,664,018 A | 9/1997 | Leighton ..................... 380/54 |
| 5,686,759 A * | 11/1997 | Hyde et al. .................. 257/730 |
| 5,687,236 A | 11/1997 | Moskowitz et al. .......... 380/28 |
| 5,721,781 A | 2/1998 | Deo et al. ...................... 380/25 |
| 5,734,752 A | 3/1998 | Knox .......................... 382/212 |
| 5,745,604 A | 4/1998 | Rhoads ........................ 382/232 |
| 5,757,521 A | 5/1998 | Walters et al. .................. 359/2 |
| 5,768,426 A | 6/1998 | Rhoads ........................ 382/232 |
| 5,786,587 A | 7/1998 | Colgate, Jr. .................. 235/487 |
| 5,786,910 A | 7/1998 | Walters et al. .................. 359/2 |
| 5,789,733 A | 8/1998 | Jachimowicz et al. ...... 235/492 |
| 5,790,662 A | 8/1998 | Valerij et al. .................. 380/2 |
| 5,790,703 A | 8/1998 | Wang ......................... 382/212 |
| 5,799,092 A | 8/1998 | Kristol et al. ................. 380/51 |
| 5,801,067 A * | 9/1998 | Shaw et al. .................... 438/15 |
| 5,809,139 A | 9/1998 | Girod et al. .................... 380/5 |
| 5,825,892 A | 10/1998 | Braudaway et al. .......... 382/51 |
| 5,838,814 A | 11/1998 | Moore ......................... 382/115 |
| 5,841,886 A | 11/1998 | Rhoads ........................ 382/115 |
| 5,862,247 A | 1/1999 | Fisun et al. .................. 382/116 |
| 5,862,260 A | 1/1999 | Rhoads ........................ 382/232 |
| 5,869,819 A | 2/1999 | Knowles et al. ............. 235/375 |
| 5,875,249 A | 2/1999 | Mintzer et al. ............... 380/54 |
| 5,890,807 A * | 4/1999 | Igel et al. .................... 382/100 |
| 5,900,954 A | 5/1999 | Katz et al. ...................... 359/2 |
| 5,930,377 A | 7/1999 | Powell et al. ................ 382/100 |
| 5,930,767 A | 7/1999 | Reber et al. .................. 705/26 |

(Continued)

FOREIGN PATENT DOCUMENTS

| DE | 2943436 A1 | 5/1981 |
| JP | 3185585 A | 8/1991 |
| WO | WO95/14289 A2 | 5/1995 |
| WO | WO96/36163 A2 | 11/1996 |
| WO | WO97/43736 A1 | 11/1997 |

Primary Examiner—Andrew W. Johns

(57) ABSTRACT

The present invention relates generally to steganography. In one implementation we provide a method comprising: receiving optical scan data representing at least a portion of a physical object. The physical object includes information steganographically hidden thereon, and the information includes at least some information indicating an operation of the physical object. The method also includes analyzing the optical scan data to obtain the information, and based at least in part on the information determining whether the physical object is operating as expected. Of course, other implementations are provided as well.

19 Claims, 2 Drawing Sheets

U.S. PATENT DOCUMENTS

| | | | |
|---|---|---|---|
| 5,932,119 A | 8/1999 | Kaplan et al. | 219/121.58 |
| 5,943,422 A | 8/1999 | Van Wie et al. | 380/9 |
| 5,949,055 A | 9/1999 | Fleet et al. | 235/469 |
| 5,955,961 A | 9/1999 | Wallerstein | 340/825.83 |
| 6,000,607 A | 12/1999 | Ohki et al. | 235/379 |
| 6,024,287 A | 2/2000 | Takai et al. | 235/493 |
| 6,041,295 A | 3/2000 | Hinderks | 704/206 |
| 6,047,888 A | 4/2000 | Dethloff | 235/380 |
| 6,068,192 A | 5/2000 | McCabe et al. | 235/487 |
| 6,069,955 A | 5/2000 | Coppersmith et al. | 380/54 |
| 6,101,602 A | 8/2000 | Fridrich | 713/176 |
| 6,122,403 A | 9/2000 | Rhoads | 382/233 |
| 6,131,161 A | 10/2000 | Linnartz | 713/176 |
| 6,157,330 A | 12/2000 | Bruekers et al. | 341/143 |
| 6,163,842 A | 12/2000 | Barton | 713/176 |
| 6,171,734 B1 | 1/2001 | Warner et al. | 430/10 |
| 6,193,163 B1 | 2/2001 | Fehrman et al. | 235/488 |
| 6,199,144 B1 | 3/2001 | Arora et al. | 711/145 |
| 6,202,932 B1 | 3/2001 | Rapeli | 235/491 |
| 6,205,249 B1 | 3/2001 | Moskowitz | 382/232 |
| 6,208,745 B1 | 3/2001 | Florencio et al. | 382/100 |
| 6,209,092 B1 | 3/2001 | Linnartz | 713/176 |
| 6,219,634 B1 | 4/2001 | Levine | 704/200 |
| 6,243,480 B1 | 6/2001 | Zhao et al. | 382/100 |
| 6,244,514 B1 | 6/2001 | Otto | 235/492 |
| 6,247,644 B1 | 6/2001 | Horne et al. | 235/380 |
| 6,252,685 B1 | 6/2001 | Yokochi | 359/2 |
| 6,252,972 B1 | 6/2001 | Linnartz | 382/100 |
| 6,257,486 B1 | 7/2001 | Teicher et al. | 235/380 |
| 6,266,430 B1 | 7/2001 | Rhoads | 382/100 |
| 6,285,776 B1 | 9/2001 | Rhoads | 382/100 |
| 6,301,660 B1 | 10/2001 | Benson | 713/165 |
| 6,307,949 B1 | 10/2001 | Rhoads | 382/100 |
| 6,311,214 B1 | 10/2001 | Rhoads | 709/217 |
| 6,320,965 B1 | 11/2001 | Levine | 380/34 |
| 6,321,981 B1 | 11/2001 | Ray et al. | 235/380 |
| 6,324,573 B1 | 11/2001 | Rhoads | 709/217 |
| 6,325,285 B1 | 12/2001 | Baratelli | 235/380 |
| 6,332,194 B1 | 12/2001 | Bloom et al. | 713/176 |
| 6,337,752 B1 | 1/2002 | Heckenkamp et al. | 359/2 |
| 6,351,815 B1 | 2/2002 | Adams | 713/200 |
| 6,374,036 B1 | 4/2002 | Ryan et al. | 386/94 |
| 6,385,330 B1 | 5/2002 | Powell et al. | 382/100 |
| 6,389,151 B1 | 5/2002 | Carr et al. | 382/100 |
| 6,401,206 B1 | 6/2002 | Khan et al. | 713/176 |
| 6,424,725 B1 | 7/2002 | Rhoads et al. | 382/100 |
| 6,442,284 B1 | 8/2002 | Gustafson et al. | 382/100 |
| 6,449,377 B1 | 9/2002 | Rhoads | 382/100 |
| 6,487,301 B1 | 11/2002 | Zhao | 382/100 |
| 6,527,173 B1 | 3/2003 | Narusawa et al. | 235/380 |
| 6,536,665 B1 | 3/2003 | Ray et al. | 235/380 |
| 6,539,475 B1 | 3/2003 | Cox et al. | 713/100 |
| 6,549,638 B2 | 4/2003 | Davis et al. | 382/100 |
| 6,580,819 B1 | 6/2003 | Rhoads | 382/135 |
| 6,608,911 B2 | 8/2003 | Lofgren et al. | 382/100 |
| 6,614,914 B1 | 9/2003 | Rhoads et al. | 382/100 |
| 6,618,484 B1 | 9/2003 | Weber et al. | 380/232 |
| 6,636,615 B1 | 10/2003 | Rhoads et al. | 382/100 |
| 6,674,886 B2 | 1/2004 | Davis et al. | 382/135 |
| 6,681,029 B1 | 1/2004 | Rhoads | 382/100 |
| 6,742,712 B1 | 6/2004 | Kawaguchi et al. | 235/492 |
| 6,882,737 B2 | 4/2005 | Lofgren et al. | 382/100 |
| 2001/0002931 A1 | 6/2001 | Maes et al. | 382/100 |
| 2001/0020270 A1 | 9/2001 | Yeung et al. | 713/176 |
| 2001/0030769 A1 | 10/2001 | Jacobs | 358/429 |
| 2001/0033674 A1 | 10/2001 | Chen et al. | 382/100 |
| 2001/0037313 A1 | 11/2001 | Lofgren et al. | 705/67 |
| 2001/0054144 A1 | 12/2001 | Epstein et al. | 713/161 |
| 2001/0054150 A1 | 12/2001 | Levy | 713/176 |
| 2002/0021823 A1 | 2/2002 | Muratani | 382/100 |
| 2002/0023020 A1 | 2/2002 | Kenyon et al. | 705/26 |
| 2002/0057823 A1 | 5/2002 | Sharma et al. | 382/100 |
| 2002/0080992 A1 | 6/2002 | Decker et al. | 382/100 |
| 2002/0095577 A1 | 7/2002 | Nakamura et al. | 713/176 |
| 2002/0111919 A1 | 8/2002 | Weller et al. | 705/67 |
| 2002/0116509 A1 | 8/2002 | DeLaHuerga | 709/229 |
| 2002/0118565 A1 | 8/2002 | Matsuo | 365/94 |
| 2002/0170966 A1 | 11/2002 | Hannigan et al. | 235/462.01 |
| 2003/0002710 A1 | 1/2003 | Rhoads | 382/100 |
| 2003/0012548 A1 | 1/2003 | Levy et al. | 386/46 |

\* cited by examiner

Binary data payload    0    1    1    0      FIG. 2A

Payload as +1/-1    -1   1   1   -1      FIG. 2B

| 1 | 1 | -1 | 1 | 1 | -1 | 1 |
|---|---|---|---|---|---|---|
| -1 | 1 | 1 | -1 | 1 | 1 | -1 |
| 1 | -1 | -1 | 1 | 1 | -1 | -1 |
| 1 | 1 | -1 | 1 | -1 | -1 | 1 |
| -1 | -1 | -1 | -1 | 1 | 1 | 1 |
| -1 | 1 | 1 | -1 | 1 | 1 | -1 |
| -1 | 1 | -1 | -1 | -1 | 1 | -1 |

FIG. 2C

| -1 | 1 | -1 | -1 | -1 | -1 | 1 |
|---|---|---|---|---|---|---|
| 1 | 1 | 1 | 1 | -1 | 1 | -1 |
| -1 | 1 | -1 | 1 | -1 | 1 | -1 |
| 1 | -1 | 1 | 1 | -1 | 1 | -1 |
| -1 | -1 | 1 | 1 | 1 | 1 | -1 |
| 1 | 1 | 1 | 1 | 1 | 1 | -1 |
| 1 | -1 | -1 | -1 | 1 | -1 | -1 |

FIG. 2D

METHODS AND TANGIBLE OBJECTS EMPLOYING MACHINE READABLE DATA

RELATED APPLICATION DATA

This application is a continuation of application Ser. No. 11/106,186, filed Apr. 13, 2005 (now U.S. Pat. No. 7,076,084), which is a continuation of application Ser. No. 10/693,269, filed Oct. 23, 2003 (now U.S. Pat. No. 6,882,738), which is a continuation of application Ser. No. 09/151,492, filed Sep. 11, 1998 (now abandoned). This application is also related to application Ser. No. 08/438,159, filed May 8, 1995 (now U.S. Pat. No. 5,850,481), which is a continuation-in-part of application Ser. No. 08/327,426, filed Oct. 21, 1994 (now U.S. Pat. No. 5,768,426), which is a continuation-in-part of abandoned application Ser. No. 08/215,289, filed Mar. 17, 1994.

The subject matter of this application is also related to that of the present assignee's other issued patents (U.S. Pat. Nos. 5,636,292, 5,710,834, 5,721,788, 5,745,604, 5,748,763, 5,748,783, 5,768,426, and 5,809,160, 5,841,978, 5,832,119, 5,822,436, 5,841,886, 5,862,260, 6,026,193, 6,122,392, 6,122,403, and 6,449,377).

FIELD OF THE INVENTION

The present invention relates to methods and systems for inconspicuously marking utilitarian objects (e.g. microprocessors, compact disks, pharmaceutical tablets, bolts and hardware, wristwatches, automotive components, etc.) with digital data.

BACKGROUND AND SUMMARY OF THE INVENTION

Sometimes things are not what they seem. An Intel integrated circuit, sold by a local computer shop as a 400 MHz Pentium II, may have been a 333 MHz Pentium II when it left the Intel factory. A defense contractor who ordered a specially-tested $50 bolt for use in a demanding aerospace application may be supplied with an inferior 50 cent bolt instead. Many enterprises suffer by such fraudulent product substitution.

Considering more particularly the integrated circuit case, IC manufacturers rigorously test their chips to assure that published specifications are met under all expected operating conditions. A chip that meets specs when operated at 400 MHz commands a substantial price premium over a chip that meets specs only at 333 MHz.

Commonly, chips with lower speed ratings are produced on the same fabrication lines as chips with top speed ratings but, during post-fab testing, fail to meet the more demanding spec under some extreme of operating conditions (e.g. at stressful ambient conditions, marginal power supply potentials, etc.). Unscrupulous distributors, aware that such chips may meet the higher specs under most conditions, sometimes "push" the speed ratings and re-mark, e.g., a 333 MHz chip as the much more costly 400 MHz chip.

Accounts of such duplicity are common. The Jun. 5, 1998, Orange County Register reported on purchasers who were duped into buying 233 MHz Pentium II processors for $620 each (instead of their then-prevailing $198 price), thinking they were 300 or 350 MHz models. Three days later, an account of such deception appeared in Computer Dealer news, this time involving incidents in Germany. Soon thereafter, Hong Kong Customs officials seized HK $2.9 million of similarly re-labeled Pentium II processors. (South China Morning Post, Aug. 18, 1998.)

Large computer companies, wary of unscrupulous chip distributors, commonly perform their own quality assurance testing of incoming chips. This testing is complex, costly, and time-consuming, but is viewed as necessary in order to assure the quality of the computer company's products.

One solution to this problem is for the manufacturer to encode—at the conclusion of testing—the chip's speed in a write-once memory (e.g. fusible links) formed in the integrated circuitry. This data can then be read-out by a subsequent purchaser of the chip to determine the original manufacturer's intended speed rating. Such an arrangement is detailed in Intel's U.S. Pat. No. 5,734,274.

While this electrical-encoding approach obviates the need for the purchaser to perform its own lengthy quality assurance testing, other drawbacks persist. For example, the purchaser must still remove the chip connector from its static-protective packaging and mate it with the socket of a reader device in order to discern the encoded speed data. So doing exposes the chip to potential static damage, thus requiring that this procedure be performed in a highly controlled environment by skilled personnel. Moreover, this approach increases the semiconductor die size, and impacts the yield.

A related approach is to form several (e.g. eight) metal traces on or near the exterior of the integrated circuit package, and laser-cut selected traces to represent one of, e.g., 256 different product grades/configurations. Such an arrangement is detailed in Intel's U.S. Pat. No. 5,686,759.

While an improvement in some respects over the fusible link approach, this latter technique has drawbacks of its own. For example, the provision of the metal traces on or near the exterior of the package limits packaging options, and makes assembly of the package more complex. Moreover, fairly sophisticated inspection equipment must be used to discern these product markings.

Finally, both of the foregoing approaches are suitable only with integrated circuits and the like, and have no counterpart, e.g., for bolts, etc.

To mark articles other than circuitry, a variety of techniques can be used. Most commonly, alphanumeric symbols are printed or otherwise formed on articles, permitting identification by inspection. However, such markings can readily be altered (as demonstrated by the remarking of integrated circuits, discussed above).

If a product marking is to be made resistant to tampering, a first step is to hide its significance from potential tamperers. One way of doing this is to employ computer-readable indicia (such as bar-codes), instead of alphanumeric symbols.

While bar codes are less likely to invite tampering than alphanumeric symbols, they still stand out as product markings. Still better would be product markings that, altogether, escape recognition as such.

Various such techniques are known. For example, numerous patents teach the marking of paper currency, lottery tickets and the like, with magnetic particles, phosphorescent dyes, etc. Such marking permits the authenticity of the articles to be verified. But the "bandwidth" of such inconspicuous techniques is quite limited, commonly being restricted to a single valid/invalid determination. Moreover, most such techniques are ill-suited for after-the-fact application to an article. Instead, such markings must generally be implemented as part of the article's original formation In accordance with a preferred embodiment of the present invention, the foregoing and other drawbacks of the prior art are overcome. In an illustrative embodiment, the ceramic or plastic housing of an integrated circuit is provided with a textured surface in which digital data is encoded. The texturing does not alert the public to the conveyance of data, yet tens- or hundreds- of bits of data can be conveyed. The textured surface can be "read" using a hand-held scanner, without exposing the integrated circuit to possible static damage. Chip speed, together with other encoded data (e.g. date of fabrication, place of fabrication, size of cache, etc.) can thereby be discerned. Inspection of chips can be performed quickly by less-skilled personnel, and without special environmental controls.

In some embodiments, the texturing is effected through tooling used to produce, or modify, the packaging. In others, the texturing is effected by a patterned layer of additional material applied to a smooth surface. In still other embodiments, the surface is not textured but instead is printed with a seemingly random pattern in which the digital information is encoded.

These techniques can be applied to any utilitarian object. Pharmaceuticals, compact disks, bolts and special hardware, automotive parts, and wristwatches, are just a few other examples.

The foregoing and other features and advantages of the present invention will be more readily apparent from the following detailed description, which proceeds with reference to the accompanying drawings.

BRIEF DESCRIPTION OF THE DRAWINGS

FIG. 2 detail steps in an encoding process used in one embodiment of the invention.

DETAILED DESCRIPTION OF ILLUSTRATIVE EMBODIMENTS

Figure 1:
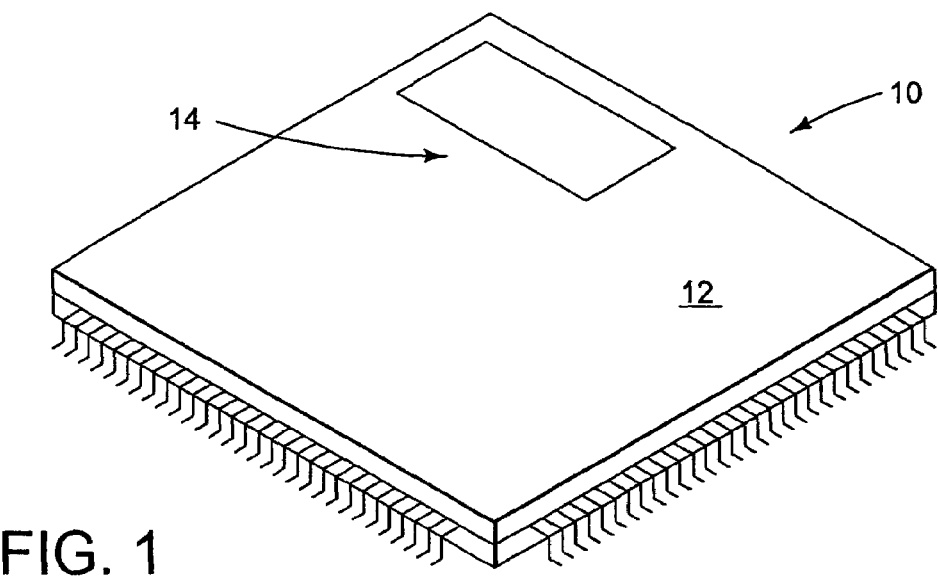
FIG. 1 shows an integrated circuit having a textured package according to one embodiment of the present invention.

Referring to FIG. 1, an integrated circuit 10 includes an exterior housing, or package 12. The housing can be formed in numerous ways. One is by injection molding. Another is by known ceramic-shaping techniques. At some point prior to shipment, the surface micro-topology of an area 14 on the housing is shaped in a seemingly random manner. (The area 14 can span the entire housing, if desired.) In the preferred embodiments, the patterning is substantially uniform across its extent, and may look like pebbling, mottling, graininess, or roughness. Yet this seemingly random surface conveys plural-bit digital information.

In an illustrative production cycle, a semiconductor wafer is processed to form several integrated circuits. Testing is conducted to determine the speed rating (or other grade) of each circuit. (The testing can be done while all the circuits are still on the wafer, or after the wafer has been diced into dies, or after the dies have been packaged in a housing.) The housing is shaped with a texture that reflects the test results, and/or other circuit characteristics.

The circuits then enter the stream of commerce and eventually end up at a computer manufacturer. On receipt, the manufacturer checks the circuits' grade using a simple hand-scanner. The scanner reflects light from the textured surfaces of the integrated circuit packages, producing data that is fed to a microprocessor-based terminal. The terminal decodes the data and extracts the encoded information (optionally referring to a look-up-table or database to expand coded values into textual descriptions). The terminal presents a display of the decoded information (e.g. speed rating, date and place of manufacture, etc.), and logs same into an inventory control database. If the decoded speed rating is different than that marked on the package, the manufacturer can return the circuit to the distributor as being non-conforming.

In an exemplary embodiment, the encoded information is 32 bits, and is broken down into fields as follows:

| Bits 1-5 | Processor speed: | 0 - unspecified |
|---|---|---|
| | | 1 - 100 MHz |
| | | 2 - 125 MHz |
| | | 3 - 133 MHz |
| | | 4 - 150 MHz |
| | | 5 - 166 MHz |
| | | 6 - 175 MHz |
| | | 7 - 200 MHz |
| | | 8 - 225 MHz |
| | | 9 - 233 MHz |
| | | 10 - 250 MHz |
| | | 11 - 266 MHz |
| | | 12 - 275 MHz |
| | | 13 - 300 MHz |
| | | 14 - 325 MHz |
| | | 15 - 333 MHz |
| | | 16 - 350 MHz |
| | | 17 - 366 MHz |
| | | 18 - 375 MHz |
| | | 19 - 400 MHz |
| | | 20 through 31 - [reserved] |
| Bits 6-20 | Manufacture date, coded as day numbers, with 0 = Jan. 1, 1998 | |
| Bits 21-23 | Cache | 0 - no cache |
| | | 1 - 128 cache |
| | | 2 - 256K cache |
| | | 3 - 512K cache |
| | | 4 - 1024K cache |
| | | 5 through 7 [reserved] |
| Bits 24-28 | Fab identification | 0 - Fab line #1 |
| | | 1 - Fab line #2 |
| | | ... etc ... |
| Bits 29-32 | Processor Family | 0 - Pentium |
| | | 1 - Pentium with MMX |
| | | 2 - Pentium II |
| | | 3 - Mobile Pentium |
| | | 4 - Pentium II Xeon |
| | | 5 - Celeron |
| | | 6 through 15 - [reserved] |

Considering the encoding process in more detail, there are many techniques for representing plural bits of binary data in noise-like patterns. Many rely on spread-spectrum techniques. In one technique (FIG. 2), the binary data is represented as a sequence of "−1"s and "1"s, instead of "0"s and "1"s. The binary data payload can comprise a single datum, but more typically comprises several. For expository convenience, the data payload in the exemplary embodiment comprises 4 bits. More or less bits, of course, can be used. (Error detecting/correcting bits can be included if desired.)

A pseudo-random grid pattern, also comprised of "−1"s and "1"s, is generated. (In the exemplary embodiment, the pseudo-random grid pattern is 7×7 cells, as shown in FIG. 2C.) To encode, the first element of the grid is multiplied by the first bit of the binary data payload. The second element of the grid is multiplied by the second bit of the binary data payload, and so forth. At the fifth element of the grid, the binary data payload has been exhausted, so it is recycled from the beginning. Thus the fifth element of the grid corresponds to the first bit of the payload, the second element of the grid corresponds to the second bit of the payload, etc. The results are shown at FIG. 2D. This process yields an output grid pattern of "−1"s and "1"s in which the binary data sequence has been encoded. (In other embodiments, the bits of the binary data payload need not be mapped to successive cells of the pseudo-random grid in row/column order. Instead, any known mapping of payload bits to grid cells can be employed.)

(It will be recognized that the binary data payload can be extracted from the output grid pattern by the inverse of the just-described operation. The values in the output grid pattern are divided by corresponding elements of the same pseudo-random grid pattern, yielding a repeated version of the binary data payload sequence.)

After the output grid pattern is determined, the pattern is used to texture the surface of the integrated circuit housing. If the housing is made by an injection molding process, the mold can be etched by a computer-driven etching apparatus. Each cell in the output grid pattern can correspond, e.g., to a 250×250 micron patch on the mold. If the output grid pattern in a particular cell has a value of "1," a depression can be formed in a corresponding patch on the mold surface. If the output grid pattern in a particular cell has a value of "−1," no depression is formed. (The depth of the depressions can depend on aesthetic considerations. Typical depressions have a depth less than a half millimeter, and may be on the order of the patch size (250 microns) or less.)

The resulting pattern of mold-pitting is a physical manifestation of the output grid pattern. When the mold is used to form an integrated circuit housing, the negative of this pattern will be created, with each pit resulting in a raised point on the housing.

The size of the textured region depends on the patch size, and the number of rows/columns in the output grid pattern. The larger the textured region, the more "signal" is available for decoding, and the less exacting can be the specifications of the reading device. A textured region about one centimeter on a side has been found to provide more than adequate signal. Smaller textured regions (or larger) can be used, depending on the application requirements.

Techniques other than computer-controlled etching apparatuses can be used to shape the mold in accordance with the output grid signal. A small computer-controlled milling machine can be used. So can laser cutting devices.

While the foregoing approach contemplates that the housing is formed with the texture already on it, in other embodiments the housing can be formed with a flat surface, and the texturing applied later, as by a heated press mold (assuming the packaging material is thermoplastic).

To enhance the "signal" conveyed by the texturing, surface changes can be made corresponding to both "1" and "−1" values in the output pattern grid (instead of just corresponding to the "1" values, as described above). Thus, raised areas are formed in patches corresponding to "1" valued output pattern cells, and pits are formed corresponding to "−1" valued output pattern cells.

In other embodiments, the texturing can also be applied by an additional layer of material applied to the housing in the desired output pattern after the housing has been formed. For example, a viscous ink can be applied in a screen printing process. The screen has an opening where the corresponding cell of the output grid pattern has a "1" value, and no opening otherwise. When the viscous ink is applied through the screen, small patches of ink are deposited where the screen had openings, but not elsewhere. (Patches larger than 250 microns may be employed in such embodiments, depending on the resolution limitations of the screen printing process.) The result is again a textured surface, with the pattern of raised areas conveying the binary data payload.

Various material other than ink can be applied to form the textured layer on top of the housing. Thermoplastics and epoxy resins are just two alternatives.

In some such embodiments, techniques other than printing are used to apply a textured layer to the housing. For example, various photolithographic techniques can be used. One technique employs a photo-reactive polymer, which is applied to the surface and then optically exposed through a mask corresponding to the output grid pattern. The exposed polymer is developed, thereby removing patches of material.

In still other embodiments, the output grid pattern is printed onto the housing surface in two contrasting colors (e.g. black and white). Cells having a "1" value can be printed in one color, and cells having a "−1" value can be printed in another. In such embodiments, the binary payload is not discerned from a pattern of textures, but rather from a pattern of contrasting colors.

In a variant of the foregoing embodiment, a single color of ink is employed; the color of the housing provides the contrast.

Numerous other micro-shaping and -texturing technologies can similarly be employed, as will be familiar to artisans in that field.

The earlier-described algorithm for generating the output grid pattern is exemplary, but a great many other encoding algorithms can be used. One employs N different frames of pseudo-random values ("−1" and "1"), where N is the number of bits in the binary payload. The frame can have any size. An exemplary frame is an array of 128×128 cells. (Each cell again is 250 microns on a side, resulting in a frame size of about 0.8 cm×0.8 cm.) A composite frame is formed by summing selected ones of these frames, depending on the data payload. For example, if the data payload is "1010," then the first and third frames are summed (corresponding to the "1"s in the first and third bit positions). The second and fourth frames can be left un-used, or can be subtracted from the just-formed sum for better signal-to-noise ratio. The resulting output grid pattern is implemented as a texture or printed pattern on the housing, as above.

To extract the binary data payload from such a composite frame, correlation operations are performed between the composite frame and each of the component N frames. Those component frames that exhibit a high correlation correspond to bit positions having a value of "1" in the binary data payload.

Another class of encoding algorithms employs the binary data payload as coefficients representing a pattern transformed to another domain. For example, if the binary data payload consists of 16 bits, these bits can serve as 16 DCT coefficients, thereby uniquely defining a 4×4 patch of "1" and "−1" cells. This patch can be replicated as necessary to span the desired area on the housing. (The mapping between the DCT and un-transformed domain yields the seeming randomization of the resulting pattern; no pseudo-random component is expressly introduced.) To decode, the patch is transformed to the DCT domain, and the DCT coefficients provide the binary data payload.

In this and the foregoing embodiments, it is commonly desirable to provide some synchronization or calibration signal, so that the beginning of the binary data payload can be uniquely identified, and so as to enable rotation-insensitive detection. Various such signals and related techniques are disclosed in the assignee's earlier-cited applications and patents.

In addition to the encoding techniques particularly detailed above, essentially any "digital watermarking," "steganography," or "data hiding" technique known in the literature can alternatively be used. While such techniques typically embed data into imagery, the same techniques can likewise be applied to a "null" image to yield just a data embedding signal. (In systems that adaptively scale the watermark energy to image contents, the scaling function should be omitted since the "image contents" here are null.)

The References Cited section of this patent detail many such alternative marking techniques. A search of the US Patent Office's web-based search system, using keywords such as "watermark*" and "steganogr*" will reveal others. The artisan is assumed to be familiar with the range of available watermarking/data hiding/steganography art.

Figure 3:
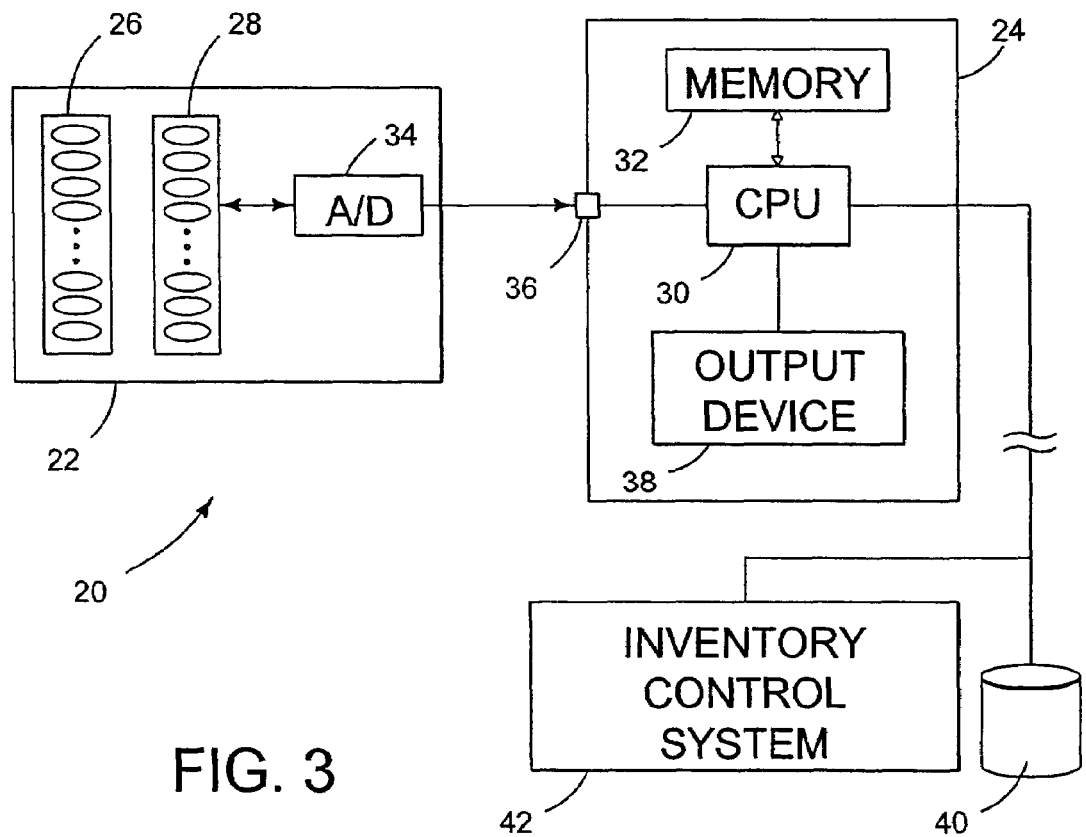
FIG. 3 is a diagram showing an apparatus used to decode textured product markings according to one embodiment of the invention.

A detector system 20 suitable for use with the foregoing embodiments is shown in FIG. 3 and includes a hand-scanner 22 and a computer 24.

The hand scanner is conventional and includes a linear light source 26 (e.g. an array of LEDs with associated lensing), a corresponding array of light detectors 28 (e.g. photodiodes), and A/D circuitry 34. The computer includes a microprocessor 30, a memory 32, an I/O port 36, and an output device 38.

The light source 26 illuminates a swath of the textured region, and the array of light detectors 28 generates analog signals related to the reflected light. These analog signals are periodically sampled and converted into digital form by the A/D converters 34, and the resultant digital data is provided to the I/O port 36.

Stored in memory 32 of the computer are software instructions causing the microprocessor 30 to perform a decoding operation on the digital data provided to the I/O port 38. In exemplary arrangements, the sampled digital data is arrayed in the memory 30 and analyzed in accordance with a decoding algorithm. (The decoding algorithm is tailored to correspond to the encoding technique by which the texture was formed.) The decoding operation outputs the originally-encoded binary data payload.

The binary data payload can be directly presented for viewing, but is preferably first "interpreted." To interpret the payload, the component fields are matched with corresponding textual descriptions (such as those presented above) using a look-up-table stored in memory 30, or using an associated (local or remote) database 40. The resulting textual descriptions are then output to the operator, using either a screen display, an audio annunciator, etc. The decoded data is also desirably entered into an inventory control system 42, noting the date, time, and location of scanning.

The foregoing discussion focused on marking of integrated circuit packaging, and use of such marking to prevent mislabeling of products. However, the disclosed techniques are likewise applicable to any other article whose surface can be textured, and to applications where true counterfeiting (rather than mis-labeling) is at issue.

Counterfeiting of commercial goods is a longstanding problem, as evidenced by sidewalk vendors of "Rolex" watches. Surfaces of watches, and other articles, can be inconspicuously textured to encode authentication data. At ports of entry, U.S. Customs officials can use hand-held scanners to confirm that the texturing encodes the expected data. To guard against artful reproduction of texture markings found on authentic goods, the encoded data can include a date beyond which importation should not be permitted. Customs officials encountering articles with expired dates can seize the goods pending an investigation. (Such encoding of expiration date data in hidden embedded data finds other applications as well.)

Texturing can also be applied to automotive components, to identify or authenticate same. For example, on new cars, vehicle identification numbers (presently printed on a dashboard plate, and on various components) can be encoded in texture form and inconspicuously applied throughout the vehicle, including etched onto glass surfaces in small patches. (The provision of such information in machine-readable form on the exterior of the vehicle enables various downstream scanned data-based applications.)

As will be apparent from the foregoing, the concepts detailed above are not limited just to integrated circuits, but instead can be applied to essentially any article—each with its own set of attendant benefits.

To provide a comprehensive disclosure without unduly lengthening this specification, applicants incorporate by reference the disclosures of the above-cited patents and applications.

Having described and illustrated the principles of our invention with reference to various embodiments thereof, it will be recognized that the invention can be modified in arrangement and detail without departing from its basic principles.

For example, while the above-described embodiments applied the texture marking to the article itself, some applications may be better served by so-marking a container in which the article is distributed. This can be advantageous, for example, when the item is textured in aid of an inventory control system—the item can be accurately identified for inventory without opening the container.

In view of the many possible embodiments to which the principles of our technology may be put, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. A method comprising:
    receiving optical scan data representing at least a portion of a physical object,
        wherein the physical object comprises information steganographically hidden thereon, and
        wherein the information comprises at least some information indicating an operation or function of the physical object;
    analyzing the optical scan data to obtain the information; and
    based at least in part on the information determining whether the physical object is operating or functioning as expected.

2. The method of claim 1 wherein the optical scan data is captured by a handheld device.

3. The method of claim 1 wherein the optical scan data comprises data generated through visible light scanning.

4. The method of claim 1 wherein the information is steganographically hidden on the physical object through laser marking.

5. The method of claim 1 wherein the physical object comprises at least some electronic circuitry, and wherein the operation or function is related to an operation or function of the electronic circuitry.

6. The method of claim 1 wherein the physical object comprises an automotive part.

7. The method of claim 1 wherein the physical object is sized to fit within a human hand.

8. The method of claim 1 further comprising assessing an operation or function of the physical object for comparison with the information.

9. A method comprising:
obtaining data comprising information steganographically encoded therein;
analyzing the data to obtain the information, the information comprising at least some information associated with an operation or function of an associated apparatus or physical object; and
based at least in part on some of the obtained information, determining whether the apparatus or physical object is operating or functioning as expected.

10. The method of claim 9 wherein the apparatus or physical object comprises at least some electronic circuitry, and said act of determining is related to an operation or function of the electronic circuitry.

11. The method of claim 9 wherein the apparatus or physical object comprises an automotive part.

12. The method of claim 9 wherein the apparatus or physical object is sized to fit within a human hand.

13. The method of claim 9 further comprising determining an operation or function of the apparatus or physical object for comparison with the information.

14. A computer readable medium comprising instructions, said instructions when executed causing a computer or apparatus to: obtain data comprising information steganographically hidden therein; analyze the data to obtain the information, the information comprising at least some information associated with an operation or function of an associated apparatus or physical object; and based at least in part on some of the obtained information, determine whether the apparatus or physical object is operating or functioning as expected.

15. A method comprising:
obtaining data comprising steganographic encoding;
analyzing the data to obtain information from the steganographic encoding, the information comprising at least some information associated with an operation or function of an associated apparatus or physical object; and
based at least in part on the obtained information, determining whether the apparatus or physical object is capable of operating or functioning as expected.

16. The method of claim 15 wherein the apparatus or physical object comprises at least some electronic circuitry, and said act of determining is related to an operation or function of the electronic circuitry.

17. The method of claim 15 wherein the apparatus or physical object comprises an automotive part.

18. The method of claim 15 wherein the apparatus or physical object is sized to fit within a human hand.

19. The method of claim 15 further comprising determining an operation or function of the apparatus or physical object for comparison with the information.

* * * * *